June 24, 1969   R. B. JOHNSON ET AL   3,451,590
RECESSED HANDLE ASSEMBLY
Filed June 21, 1967

ROBERT B. JOHNSON
WILLIAM H. GODDARD
INVENTORS

BY Gary D. Field
Robert W. Hampton
ATTORNEYS

United States Patent Office 3,451,590
Patented June 24, 1969

3,451,590
RECESSED HANDLE ASSEMBLY
Robert B. Johnson and William H. Goddard, Rochester, N.Y., assignors to Eastman Kodak Company, Rochester, N.Y., a corporation of New Jersey
Filed June 21, 1967, Ser. No. 647,709
Int. Cl. B65d 25/28
U.S. Cl. 220—94      2 Claims

ABSTRACT OF THE DISCLOSURE

A handle assembly for an article to be carried including a housing having a generally rectangular recess extending across the top from one side of the housing, adapted to contain a handle in a storage position. In the side walls of the housing are opposed openings adapted to receive complementary lugs on depending legs of the handle. The handle may be attached to the housing by sliding it into the recess with the lugs bearing against the side walls thereof bending the legs slightly toward each other. These side walls serve as guides for the handle during the assembly operation until the lugs are aligned with the openings, whereupon the arms spring outwardly, snapping the lugs into the openings.

Background of the invention

The prior art is replete with various types of removable and self-storing handles. However, the manner of attaching such handles, and the construction thereof are often quite complex, adding to the cost of the device on which they are used. For example, handles have been provided which have a detachable arm with an irregularly shaped lug at one end, which lug may be inserted into a similarly shaped opening in an article to be carried, when in an inoperative position, and then pivoted to a carrying position wherein the lug is locked within the opening. However, in this device the handle is always exposed, whether in the carrying or storage position; it is rather complex in construction, consisting of several separate parts which are connected together by complex means; and is awkward to attach. Other devices have elongated, bayonet-type slots into which lugs extending from a handle may be fitted and then, upon lifting up on the handle, the lugs lock into elongated portions in the slots so that the handle cannot become detached. The handle, however, is not movable between a storage and a use position, but is always exposed and remains in a single position. Other handles include arms which are spring-urged outwardly by a coil spring within the cross member and have outstanding ears which engage openings on a container or a housing to be transported. Thus, the prior-art handles suffer from one of the following three disadvantages: they are at all time exposed so as to be unsightly; they are quite complex and expensive to manufacture; or they are difficult and awkward to assemble, requiring several manipulations.

Summary of the invention

In the present invention, a handle assembly is provided wherein the handle is attached easily to a housing by sliding it along a recess which guides outwardly extending lugs on the handle into openings in side walls of the recess. In this manner, the handle may be attached quickly during assembly, such as in an assembly line. The lugs may be irregularly shaped and adapted to be received in similarly shaped openings so that, when the handle is rotated from a storage position within the recess to a generally vertical position for carrying, the lugs become locked within the openings and cannot be pulled therefrom. By proper sizing, the legs of the handle will frictionally engage the walls of the recess to prevent rattling and will tend to maintain the handle in either its raised or lowered position. The handle is of unitary molded construction, the legs thereof being slightly yieldable or bendable under pressure so that, as the lugs engage the side walls of the recess during assembly, the arms will be urged inwardly. Thus, when the lugs are aligned with the openings, the arms will force the lugs outwardly, snapping them into the openings. Thus, the novel handle construction facilitates the use of a very fast and efficient method of assembly.

Additional features of this invention will become apparent from the description which follows, taken in conjunction with the accompanying drawings.

Description of the preferred embodiment

Figures 1, 2:
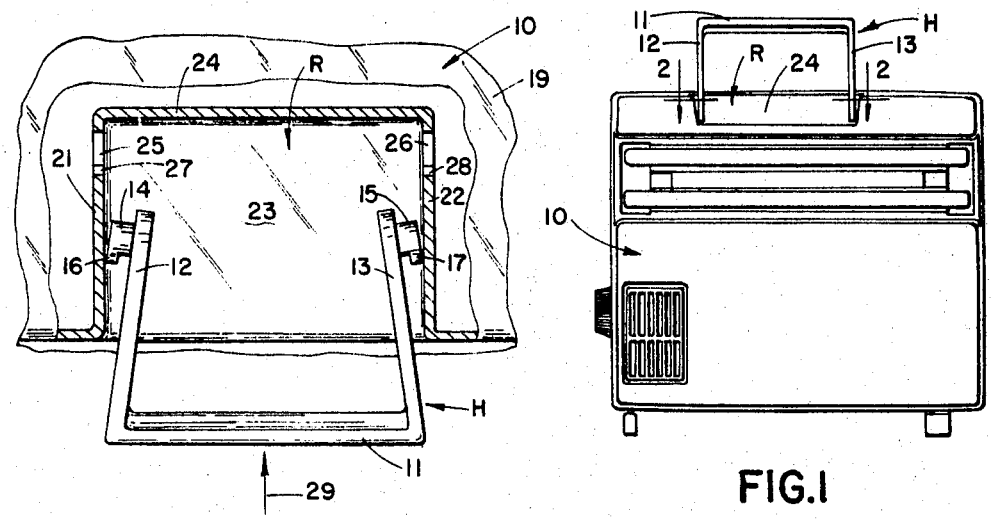
FIG. 1 is a side elevation of a movie projector housing utilizing the novel handle assembly of this invention.
FIG. 2 is an enlarged, fragmentary, horizontal section, taken along line 2—2 of FIG. 1, but showing a handle partially inserted into a recess in the housing.

In accordance with this invention, the handle assembly H may be attached within a recess R to a housing 10, which in FIG. 1 is illustrated as being the housing of a movie projector. However, it will be understood that the handle assembly may find utility on a housing for some article other than a movie projector. Conveniently, handle H may be of unitary molded construction, such as plastic, and include a cross member 11 terminating in depending legs 12 and 13. The ends of legs 12 and 13 are provided with outwardly extending lugs 14 and 15, respectively, which are illustrated as being generally circular in shape with laterally extending ears 16 and 17, respectively, for locking into openings, as described below.

Figures 3, 4:
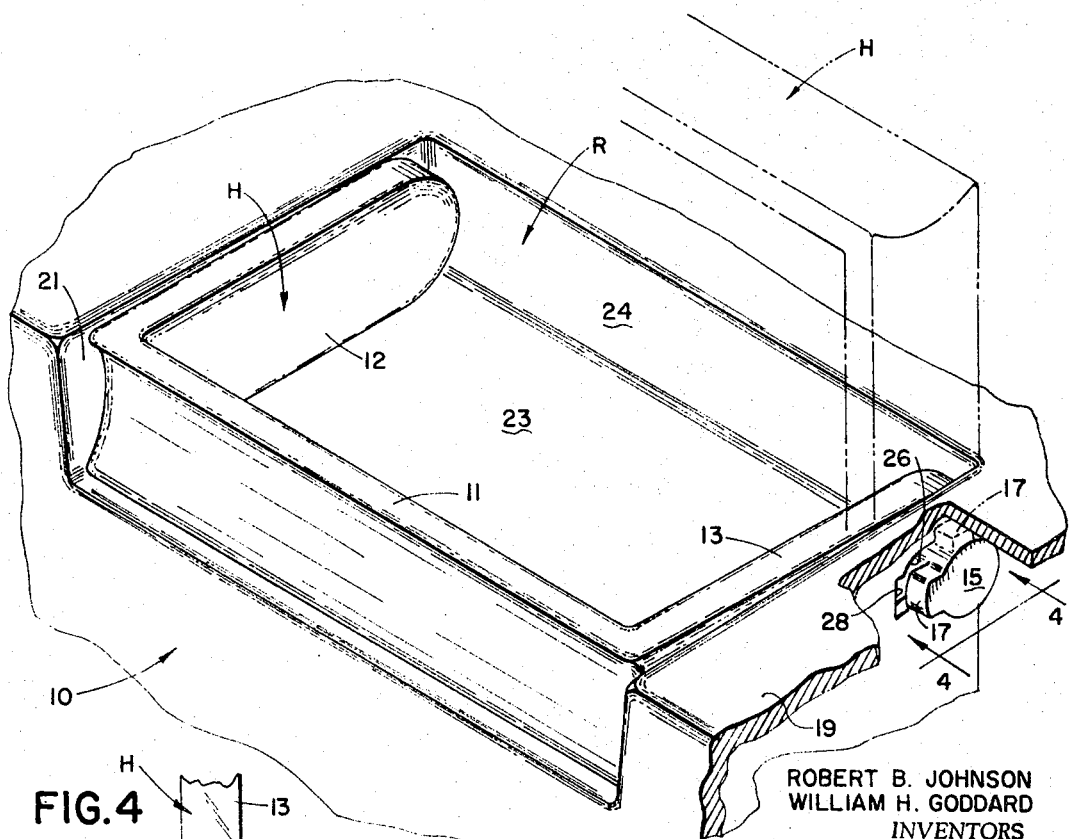
FIG. 3 is a greatly enlarged fragmentary, perspective view of the handle in storage position within the recess and shown in raised position in dotted line.
FIG. 4 is a reduced, fragmentary, horizontal section, taken along line 4—4 of FIG. 3, but showing the handle in raised position.

As can best be seen in FIGS. 2 and 3, recess R extends inwardly from side wall 18 of housing 10 into top wall 19. This recess has spaced, generally parallel side walls 21 and 22 which are interconnected by a bottom wall 23 and a back wall 24. The distance of back wall 24 from side wall 18 of housing 10 has been illustrated as being just enough so that handle H can be received therein in storage position. Conveniently, rear wall 24 may serve as an abutment for the ends of legs 12 and 13 to help align the lugs with the holes. However, it will be understood that this distance may be greater or smaller, depending on the particular requirements. In fact, the back wall could be omitted entirely so that the recess extends completely across the top of housing 10. Side walls 21 and 22 of recess R are, respectively, provided with openings 25 and 26 at the inner ends thereof. Conveniently, these openings are illustrated as being generally circular in shape so as to accommodate lugs 14 and 15 and are provided with offsets 27 and 28, respectively, for receiving ears 16 and 17 when the handle H is attached, as described below. Of course, it will be understood that the lugs on handle H and the openings in recess R may be of any configuration as long as the openings are shaped to receive the lugs on the handle when the handle is lying in a plane generally parallel to bottom wall 23 of recess R. They may be locked in the openings when the handle is raised for carrying to prevent accidental dislodgement.

Handle H may be inserted within the recess by holding it so that it is generally parallel to the plane of bottom wall 23 and squeezing inwardly on legs 12 and 13 so that their ends are bent inwardly, as shown in FIG. 2. The handle may then be slid into recess R in the direction of arrow 29. Lugs 14 and 15 bear against side walls 21 and 22 of the recess which acts as guide means for guiding the lugs into openings 25 and 26, respectively. Once the lugs are aligned with the openings, arms 12 and 13 will spring or snap outwardly, forcing them through the openings. Then, the handle may be pivoted from the storage position shown in FIG. 3 to the raised position of FIG. 4. To prevent rattling and to maintain the handle in either the raised or storage position, the legs of the handle may be spaced so as to frictionally engage the side walls of the recess.

From the foregoing, it can be seen that the novel features of this invention have been fulfilled to a marked degree. The convenient one-piece handle is provided which may be easily installed within a recess of a housing, such as the housing on a movie projector, wherein it is conveniently stored out of the way when not in use and can readily be raised or pivoted to the use or carrying position. In addition, the handle can be assembled easily by sliding it across the recess with the lugs and the handle being guided by the side walls thereof until the lugs are aligned with the openings in the side walls and snap into place. These lugs may be provided with offset portions so that the lugs are firmly locked in place when the handle is in raised position for carrying so that there is no chance that the handle might become disengaged.

The invention has been described in detail with particular reference to a preferred embodiment thereof, but it will be understood that variations and modifications can be effected within the spirit and scope of the invention as described hereinabove.

We claim:
1. A handle assembly for an article, including:
   a housing having a surface;
   a recess in said surface defined by spaced, generally parallel side walls and a bottom wall connecting said side walls;
   means defining opposed irregularly-shaped openings in said side walls respectively;
   a U-shaped handle slidable along said recess during assembly, said handle comprising a cross member having two depending, generally parallel, yieldable legs, said handle being dimensioned to have a storage position within said recess wherein it is received in said recess with said legs extending along said side walls; and
   an outwardly-extending lug on each said leg spaced from said cross member, said legs being yieldably urged toward each other as said lugs are slid along and frictionally guided by said side walls during assembly, said lugs having an irregularly-shaped configuration corresponding to said openings so that said legs urge said lugs into said openings when said lugs are aligned with said opening defining means, but said lugs are locked in said openings when said handle is pivoted from said storage position to a use position in a plane substantially perpendicular to said bottom wall.

2. A handle assembly, as defined in claim 1, wherein:
   said recess includes a rear wall extending between said side walls and serving as an abutment for the ends of said legs during assembly to align said lugs with said openings.

References Cited

UNITED STATES PATENTS

| | | | |
|---|---|---|---|
| 966,974 | 8/1910 | Williams | 16—115 |
| 2,147,471 | 2/1939 | Tyrrell et al. | 16—115 |
| 2,501,572 | 3/1950 | Marquez | 220—20 |
| 2,586,911 | 2/1952 | Bottom | 220—95 XR |
| 2,815,118 | 12/1957 | Cuni | 220—94 XR |

JOSEPH R. LECLAIR, *Primary Examiner.*

U.S. Cl. X.R.
16—115; 190—57